United States Patent
Son et al.

(10) Patent No.: US 8,670,084 B2
(45) Date of Patent: Mar. 11, 2014

(54) METHOD OF FORMING A LIQUID CRYSTAL DISPLAY DEVICE HAVING TWO LIQUID CRYSTAL DISPLAY PANELS

(75) Inventors: Nam Do Son, Gyeongsangbuk-do (KR); Hyun Ki Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 1505 days.

(21) Appl. No.: 11/637,816

(22) Filed: Dec. 13, 2006

(65) Prior Publication Data

US 2008/0002091 A1  Jan. 3, 2008

(30) Foreign Application Priority Data

Jun. 30, 2006  (KR) .................. 10-2006-0060205

(51) Int. Cl.
*G02F 1/1333* (2006.01)
*G02F 1/1347* (2006.01)

(52) U.S. Cl.
USPC .............................. 349/58; 349/74

(58) Field of Classification Search
USPC ................................ 349/58–60, 74
See application file for complete search history.

(56) References Cited

U.S. PATENT DOCUMENTS

| | | | |
|---|---|---|---|
| 6,806,920 B2 * | 10/2004 | Hayashi et al. ................. | 349/58 |
| 2003/0128316 A1 * | 7/2003 | Tsuji ............................ | 349/113 |
| 2004/0136150 A1 | 7/2004 | Ho ................................ | 361/681 |
| 2004/0264211 A1 * | 12/2004 | Han et al. ..................... | 362/561 |
| 2006/0044745 A1 * | 3/2006 | Kim ............................. | 361/681 |
| 2006/0066770 A1 * | 3/2006 | Hayano et al. ................. | 349/58 |
| 2006/0087601 A1 * | 4/2006 | Lee ............................... | 349/60 |
| 2006/0268187 A1 * | 11/2006 | Kim et al. ..................... | 349/40 |

FOREIGN PATENT DOCUMENTS

| | | |
|---|---|---|
| EP | 1 231 757 A2 | 8/2002 |
| JP | 06-043718 | 2/1994 |
| JP | 06-043743 | 2/1994 |
| JP | 2002-320012 | 10/2002 |
| JP | 2003-005863 | 1/2003 |
| JP | 2003-098981 | 4/2003 |
| JP | 2003-233328 | 8/2003 |
| JP | 2006-119536 | 5/2006 |
| JP | 2006-171388 | 6/2006 |
| JP | 2007-133281 | 5/2007 |
| JP | 2007-133285 | 5/2007 |
| JP | 2007-148048 | 6/2007 |
| KR | 10-2006-0034528 | 4/2006 |
| WO | WO 98/38822 | 9/1998 |
| WO | WO 03/065185 A1 | 8/2003 |
| WO | WO 2006/036317 A2 | 4/2006 |

* cited by examiner

*Primary Examiner* — Jessica M Merlin (74) *Attorney, Agent, or Firm* — Morgan, Lewis & Bockius LLP

(57) ABSTRACT

A liquid crystal display device including a first liquid crystal display panel disposed between a first cover and a second cover, a second liquid crystal display panel disposed between the first cover and the second cover, wherein a rear face of the second liquid crystal display panel faces a rear face of the first liquid crystal display panel, a main frame disposed between the first and second liquid crystal display panels, and a plate to connect the second liquid crystal display panel to the main frame.

7 Claims, 11 Drawing Sheets

METHOD OF FORMING A LIQUID CRYSTAL DISPLAY DEVICE HAVING TWO LIQUID CRYSTAL DISPLAY PANELS

The present invention claims the benefit of Korean Patent Application No. 10-2006-0060205 filed in Korea on Jun. 30, 2006, which is hereby incorporated by reference.

BACKGROUND OF THE INVENTION

1. Field of the Invention

The present invention relates to a liquid crystal display device and a portable computer having the liquid crystal display device, and more particularly, to a portable computer with a plurality of liquid crystal display panels.

2. Discussion of the Related Art

In general, a liquid crystal display (LCD) device has better visibility and lower power consumption than a cathode ray tube (CRT) of a similar size. In addition, the LCD device is lightweight and slim. Accordingly, the LCD device is spotlighted as a next generation display for mobile phones, computers, televisions, and the like.

Figure 1A:
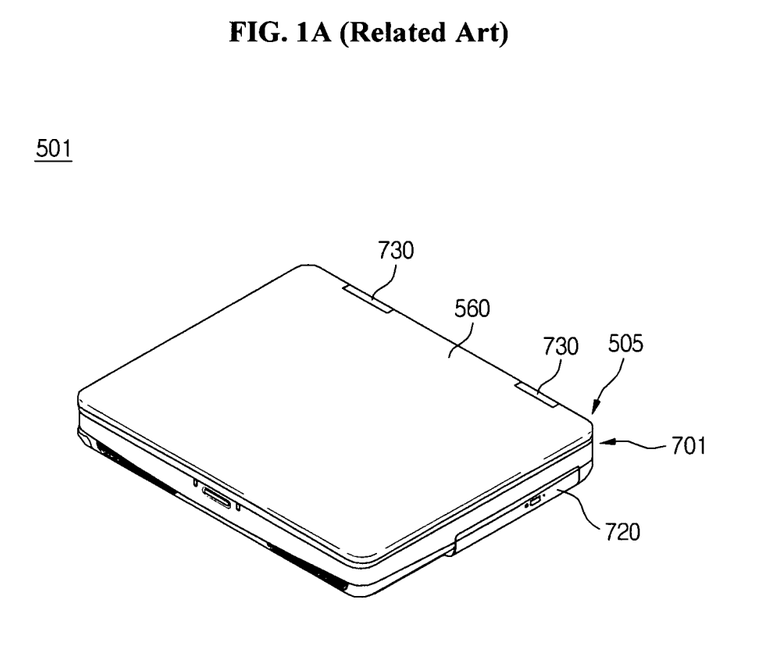
FIGS. 1A and 1B are perspective views of a related art portable computer.
Figure 1B:
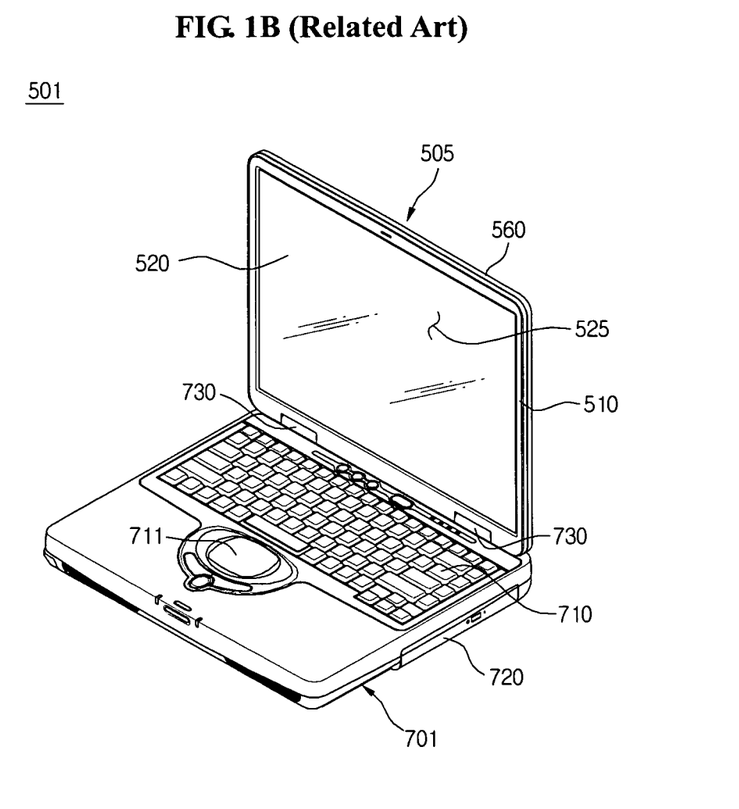

In particular, when the LCD device is applied to a portable computer, the LCD device having an LCD panel is connected to a main body of the portable computer by a hinge so that the LCD panel can be folded on the main body to enhance the portability of the portable computer. FIGS. 1A and 1B are perspective views of a related art portable computer. As shown in FIGS. 1A and 1B, a portable computer 501 includes a LCD device 505 having a LCD panel 520 and a main body 701 connected to the LCD device 505 by a hinge 730.

The LCD device 505 includes a variety of parts for displaying an image. That is, the LCD device 505 includes a driver for driving the LCD panel 520, and a backlight assembly (not shown) for emitting light toward the rear surface of the LCD panel 520. The LCD device 505 further includes rear and front cases 560 and 510, respectively, for protecting the above-described parts. The front case 510 is designed to cover an edge of the LCD panel 520 except for a display area for displaying an image. The rear case 560 is an outermost cover disposed on a rear surface of the backlight assembly to protect the LCD panel 520 and the backlight assembly from outer impact and foreign objects.

The main body 701 is connected to the LCD device 505 by the hinge 730. The main body 701 typically includes a central process unit (CPU), a memory device, a disk drive, and the like. A power supply unit 720 is typically provided on a bottom of the main body 701 and an input unit 710 is provided on a top of the main body 701. A pointing device may be further provided on the main body 701.

As described above, the LCD device 505 having a display unit 525 is connected to the main body 701 having the input unit 710 by the hinge 730. Accordingly, when the portable computer 501 is not being used, the LCD device 505 having the display unit 525 is typically folded on the main body 701, thereby protecting the input device 710 and the display unit 525 of the LCD device 505.

In order to obtain the display information of the LCD panel 520, the LCD device 505 is unfolded from the main body 701. This is troublesome for a user, especially when the user intends to obtain simple information from the LCD device 505. The user has to open the LCD device 505 to obtain information displayed on the LCD panel 520, thereby creating an inconvenience to the user.

SUMMARY OF THE INVENTION

Accordingly, the present invention is directed to a liquid crystal display device and a portable computer having the liquid crystal display device that substantially obviates one or more of the problems due to limitations and disadvantages of the related art.

An object of the present invention is to provide a liquid crystal display device that includes first and second liquid crystal display panels.

Another object of the present invention is to provide a liquid crystal display device that can easily be mass-produced.

Another object of the present invention is to provide a liquid crystal display device that conveniently displays information to a user on the exterior of a portable computer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the a liquid crystal display device and a portable computer having the liquid crystal display device includes a first liquid crystal display panel disposed between a first cover and a second cover, a second liquid crystal display panel disposed between the first cover and the second cover, wherein a rear face of the second liquid crystal display panel faces a rear face of the first liquid crystal display panel, a main frame disposed between the first and second liquid crystal display panels, and a plate to connect the second liquid crystal display panel to the main frame.

In another aspect, a portable computer, includes a liquid crystal display device having a first liquid crystal display panel disposed between a first cover and a second cover to display a first image through the first cover, a second liquid crystal display panel disposed between the first cover and the second cover to display a second image through the second cover, wherein a rear face of the second liquid crystal display panel faces a rear face of the first liquid crystal display panel, a main frame disposed between the first and second liquid crystal display panels, and a plate to connect the second liquid crystal display panel to the main frame, and a main body connected to the liquid crystal display device.

In another aspect, a method for forming a liquid crystal display device includes the steps of forming a first liquid crystal display panel disposed between a first cover and a second cover, forming a second liquid crystal display panel disposed between the first cover and the second cover, wherein a rear face of the second liquid crystal display panel faces a rear face of the first liquid crystal display panel, forming a main frame disposed between the first and second liquid crystal display panels, and forming a plate to connect the second liquid crystal display panel to the main frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 2A:
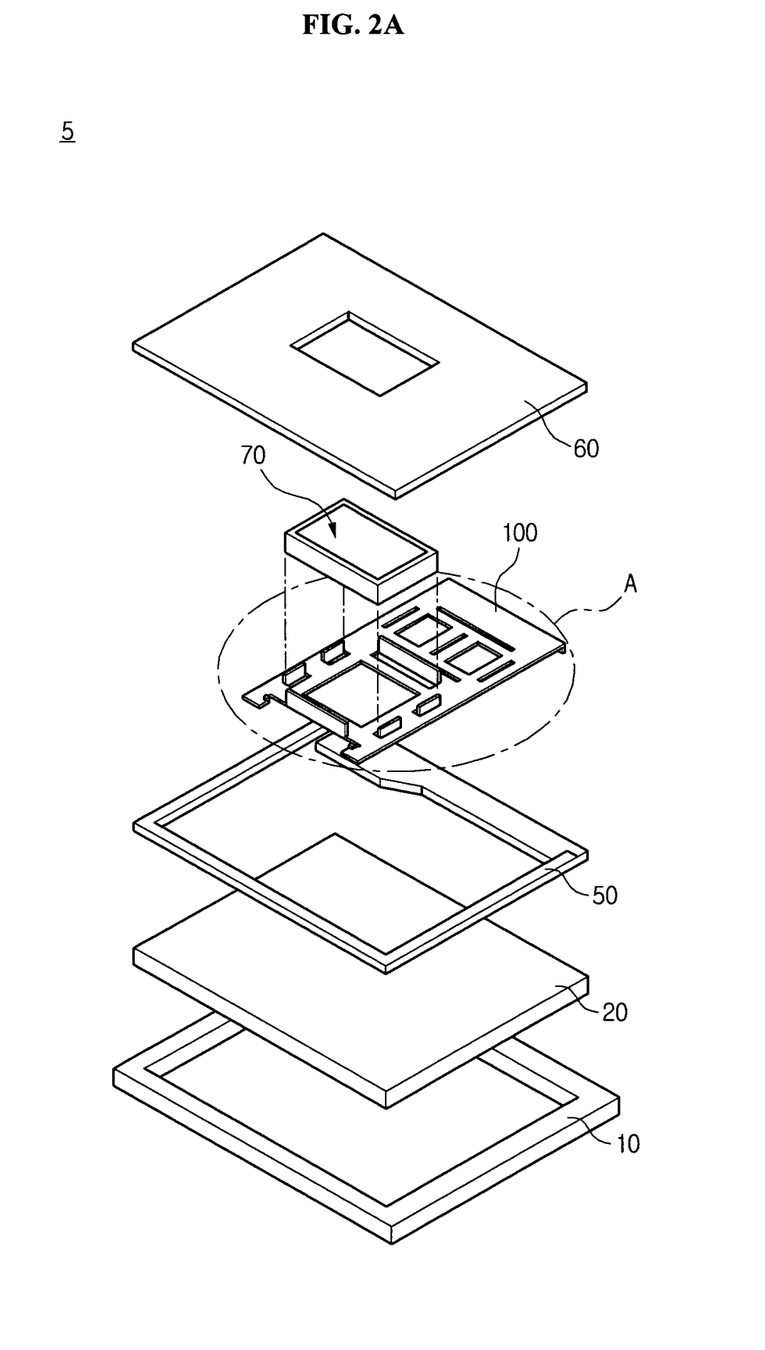
FIG. 2A is a perspective view of a liquid crystal display device according to an embodiment of the present invention.
Figure 2B:
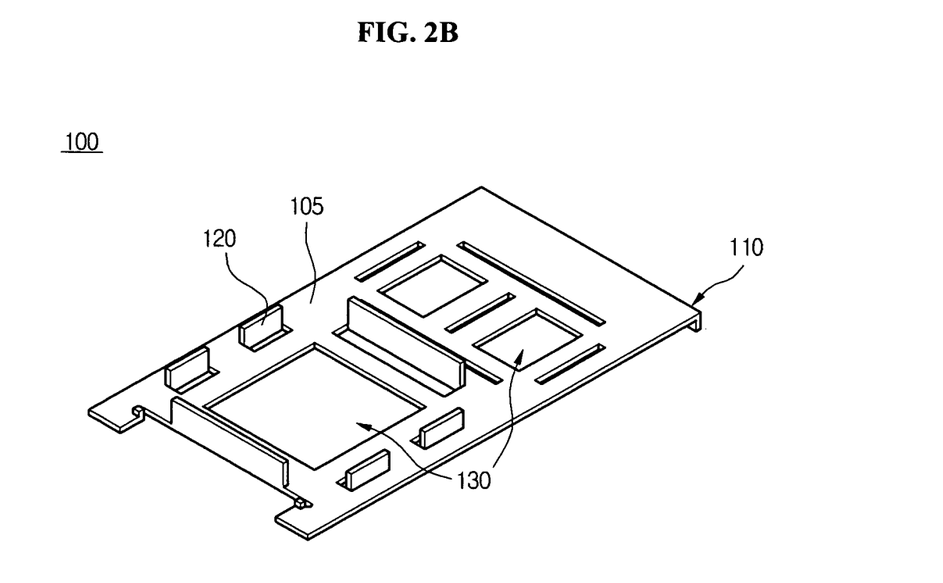
FIGS. 2B-D are alternative exemplary views of an enlarged portion A of FIG. 2A.
Figure 2C:
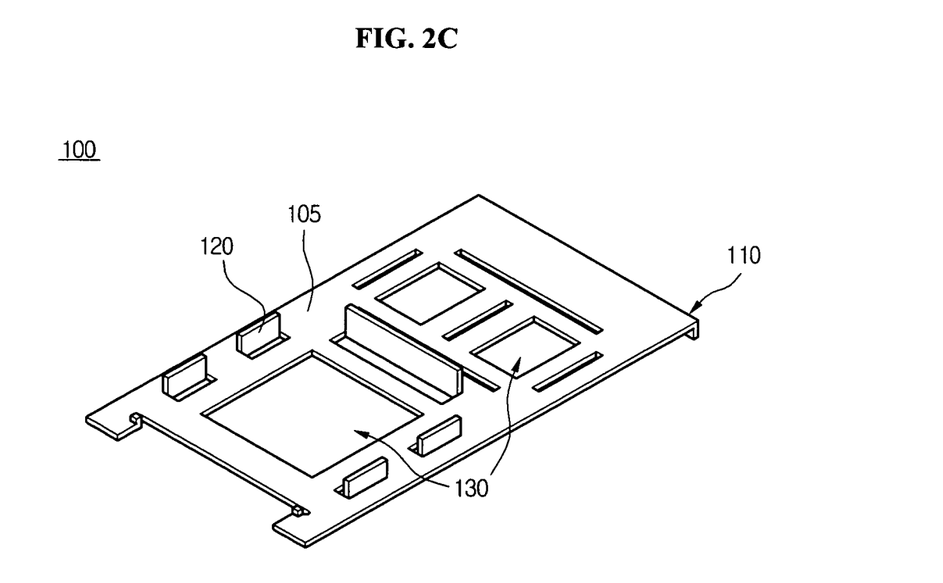
Figure 2D:
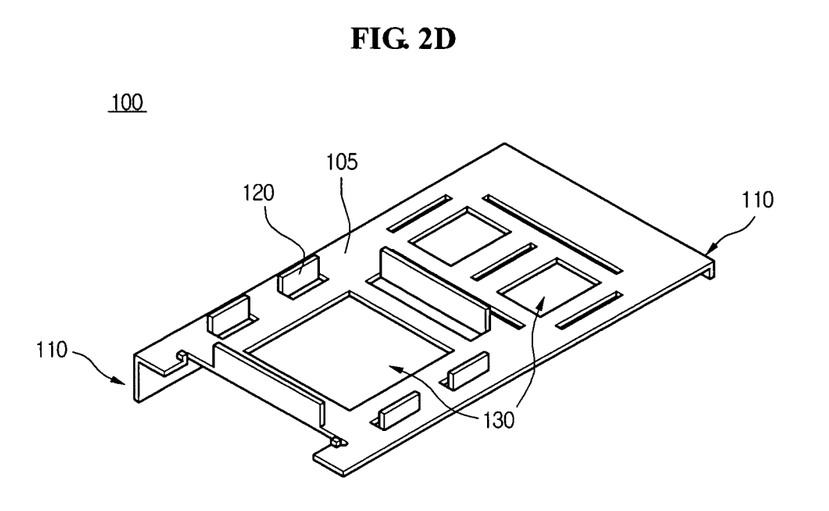

FIG. 2A is a perspective view of a LCD device 5 according to an exemplary embodiment of the present invention and FIGS. 2B-D are alternative exemplary views of an enlarged portion A of FIG. 2A. As shown in FIG. 2A, a LCD device 5 includes first and second covers 10 and 60, and first and second LCD panels 20 and 70 disposed between and protected by the first and second covers 10 and 60. While not shown, each of the first and second LCD panels 20 and 70 has a variety of devices for realizing the display functions thereof. That is, each of the first and second LCD panels 20 and 70 includes a LCD panel, a driver for driving the LCD panel, and a driving circuit unit having a variety of circuit devices.

Disposed between the first and second covers 10 and 60 is a main frame 50 for supporting and protecting the first and second LCD panels 20 and 70. The first and second covers 10 and 60 are shaped to receive the first and second LCD panels 20 and 70. In addition, the first and second covers 10 and 60 are coupled to each other to support and protect the first and second LCD panels 20 and 70 from outer shock and foreign objects. In particular, the main frame 50 is disposed between the first and second LCD panels 20 and 70 such that it supports the first and second LCD panels 20 and 70.

A plate 100 is disposed between the second LCD panel 70 and a rear surface of the main frame 50. The main frame 50 supports the plate 100. As shown in FIG. 2B, the plate 100 has a body 105, a first supporting portion 110, and a second supporting portion 120. The first supporting portion 110 is formed at an edge of the body 105 that is bent toward the first LCD panel 20 to prevent the plate 100 from moving. The second supporting portion 120 is formed to support the second LCD panel 70. In other words, the plate 100 is provided with a first supporting portion 110 by which the plate is fixed on the main frame 50 and a second supporting portion to support the second LCD panel 70. The second supporting portion 120 may be formed by bending a portion of the body 105 to correspond to a shape of the second LCD panel 70 to prevent the second LCD panel 70 from moving. The body 105 supports the load of the second LCD panel 70. Also, the second cover 60 is provided with an opening for the second LCD panel 70 to an external side.

Moreover, the shape or size of the second supporting portion 120 formed on the body 105 may be varied to accommodate a variety of shapes and sizes of the second LCD panel 70. The shape and size of the body 105 and the second supporting portion 120 can be adjusted according to the shape and size of the second LCD panel 70. Similarly, the second cover 60 is designed to correspond to the shape and size of the second LCD panel 70 such that the dual LCD device 5 having display panels formed on opposite surfaces is realized. Therefore, it is possible to standardize the LCD device 5 using the plate 100 corresponding to the second LCD panel 70.

As described above, it is possible to effectively fix and support the second LCD panel 70 without any additional structures or other members assembled with the plate 100 by forming the second supporting portion 120 on the body 105 of the plate 100. Further, the plate 100 which supports the second LCD panel 70 may be supported by the main frame 50 to prevent shaking. In other words, the plate 100 is fixedly supported on the main frame 50 that supports the first LCD panel 20.

The first supporting portion 110 that supports the plate 100 on the main frame 50 is formed on the body 105 of the plate 100. The first supporting portion 110 is formed to correspond to at least one side of the main frame 50. That is, in order to stably support the plate 100 on the main frame 50, the first supporting portion 110 is formed on the plate 100 to be supported on at least one side of the main frame 50. Furthermore, the first supporting portion 110 may be formed on additional sides of the main frame 50.

As described above, since the plate 100 is fixedly supported on the main frame 50, the second LCD panel 70 can be effectively supported and fixed in the LCD device 5 without using any additional members for fixing the second LCD panel 70 to the first LCD panel 20. Therefore, by applying the plate 100 to the LCD device 5, the manufacturing time of the LCD device 5 can be reduced, making it possible to more efficiently mass-produce the LCD device 5.

Each of FIGS. 2B-D is an alternative exemplary view of an enlarged portion A of FIG. 2A. FIG. 2C illustrates an alternative arrangement of the second supporting portion 120. In particular, the second supporting portion 120 is formed along three sides of the second LCD panel 70. FIG. 2D illustrates another arrangement of the first supporting portion 110. In particular, the first supporting portion 110 is formed along two sides of the plate 100.

The plate 100 may be formed of aluminum alloy, stainless steel, or reinforced plastic. However, other materials may be used without departing from the scope of the invention. The plate 100 is formed to be durable against outer impact and vibration and is also lightweight. Further, cut-out holes 130 may be formed on the body 105 of the plate 100 to reduce the weight of the plate 100. That is, portions (i.e., portions that correspond to the cut-out holes 130) of the body 105 except for portions supporting the main frame 50 and the second LCD panel 70 are cut away from the body 105, thereby minimizing the weight of the body 105. For example, a cut-out hole 130 is formed on a region surrounded by the second supporting portion 120 to minimize the weight as shown in FIG. 2B. As the rigidity of the body 105 may be weakened due to the cut-out hole 130, a portion of the body 105 around the cut-out hole 130 is designed to enhance the rigidity of the body 105, i.e., the plate 100 is designed to enhance the rigidity of the body 105. Since the thickness and weight of the plate 100 can be reduced by using a proper material and/or an efficient design, the thickness and weight limitation problems of the LCD device 5 can be solved.

In addition, since the second LCD panel 70 can be detachably mounted on the plate 100, assembly line compatibility for manufacture is possible. That is, when covers using the plates 100 and covers not using the plates 100 are separately manufactured, it is possible to manufacture the dual-display LCD device 5 and single-display LCD device of the related art in the same assembling line.

Figure 3A:
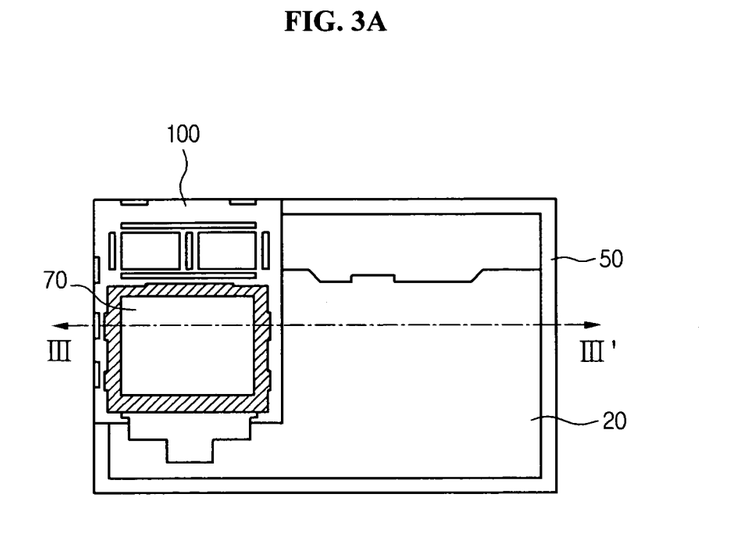
FIG. 3A is a top view of the liquid crystal display device according to an embodiment of the present invention.
Figure 3B:
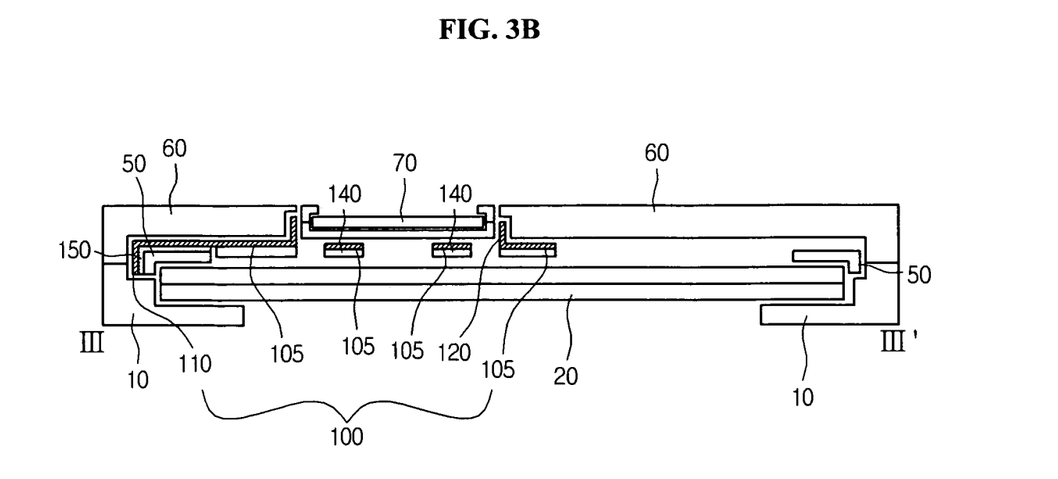
FIG. 3B is a sectional view taken along the line III-III' of FIG. 3A.

FIG. 3A is a top view of a LCD device 5 according to an exemplary embodiment of the present invention, and FIG. 3B is a sectional view taken along line III-III' of FIG. 3A. The support structure of the main frame 50 and the plate 100 will be described with reference to FIG. 3A. The first cover 10 is omitted to better illustrate a rear surface of the LCD device 5. The support structure of the plate 100 and the second LCD panel 70 will be described with reference to FIG. 3B.

As shown in FIG. 3A, the LCD device 5 includes the first and second LCD panels 20 and 70. The main frame 50 supports the first LCD panel 20. The second LCD panel 70 is provided on a rear surface of the main frame 50. The plate 100 is provided on the rear surface of the main frame 50 to support and fix the second LCD panel 70.

As shown in FIG. 3B, the LCD device 5 includes the first and second LCD panels 20 and 70. The first LCD panel 20 is supported on the main frame 50 and protected by the first cover 10. The second LCD panel 70 is provided on the rear surface of the first LCD panel 20. In particular, the second LCD panel 70 is provided on the rear surface of the main frame 50.

Figure 4:
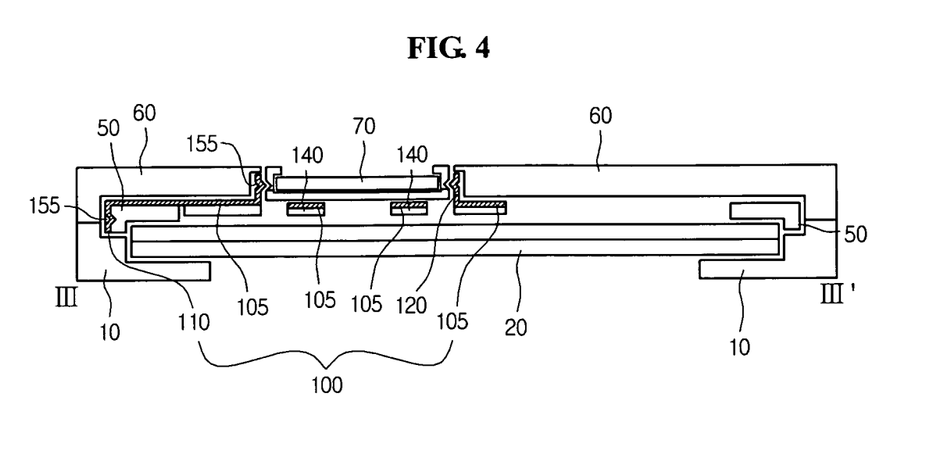
FIG. 4 is a sectional view of another exemplary embodiment of the plate of FIG. 3A.

In order to allow the body 105 of the plate 100 to be supported on the main frame 50, a hook, a chevron 155, or a two-sided tape 150, for example, may be formed on the first supporting portion 110. FIG. 3B shows an example where the two-sided tape 150 is provided to the first supporting portion 110. FIG. 4 shows an example where the chevron 155 is formed on the first supporting portion 110.

As described above, by forming the supporting force enhancing unit such as the hook, chevron 155, or two-sided tape 150 on the first supporting portion 110, the plate 100 can be supported on the main frame 50 and the first cover 10 by fixing the first supporting portion 110 on the rear portion of the main frame 50. Therefore, the plate 100 can be freely adjusted at the second cover 60 such that the position of the second LCD panel 70 can be easily adjusted.

As described above, the plate 100 is supported and fixed on the main frame 50 and the first cover 10 by the first supporting portion 110 that prevents the shaking of the plate 100. In addition, a shock absorbing member 140, such as sponge, may be provided under the body 105 of the plate 100. The first LCD panel 20 has a backlight assembly (not shown) having a plurality of optical members. When an outer shock or vibration is applied to the LCD device 5, the optical members of the backlight assembly may collide with the plate 100. As a result, the optical members of the first LCD panel 20 may be damaged, thereby deteriorating the display quality. Hence, the shock absorbing member 140 absorbs the shock and vibration to minimize the problems caused by the collision between the first LCD panel 20 and the plate 100.

Moreover, the plate 100 supports and fixes the second LCD panel 70. The second supporting portion 120 is formed on the body 105 of the plate 100 to support and fix the second LCD panel 70. The second supporting portion 120 may be formed by bending a portion of the body 105 of the plate 100. The second supporting portion 120 may be bent toward the second cover 60 to support the sides of the second LCD panel 70.

As described above, the plate 100 is formed between the second cover 60 and the main frame 50. As no additional structure for supporting/fixing the second LCD panel 70 is required in the LCD device 5, the cost of manufacturing the LCD device 5 can be reduced. Furthermore, the assembling time of the second LCD panel 70 is also reduced, thereby increasing productivity of the LCD device 5.

As the second supporting portion 120 is bent toward the second cover 60, the second LCD panel 70 can be easily attached to and detached from the second supporting portion 120. Therefore, the plate 100 can be compatibly applied to any production lines or manufacturing processes for manufacturing the LCD device 5. That is, the dual LCD device 5 can be compatibly manufactured using the plate 100 on any production lines.

FIG. 4 is a view of another exemplary embodiment of the plate of FIG. 3A. Referring to FIG. 4, a LCD device 5 includes first and second liquid crystal display panels 20 and 70. The first supporting portion 110 is supported and fixed or attached to the first cover 10 or the main frame 50. The second supporting portion 120 contacts the second cover 60 of the second LCD panel 70. The first and second supporting portions 110 and 120 are bent having chevrons 155 and the second cover 60 of the second LCD panel 120 and the main frame 50 are provided with grooves corresponding to the chevrons 155. As described above, the plate 100 is provided to fix the second LCD panel 70 on the main frame 50. As a result, an image can be displayed in two directions.

Figure 5A:
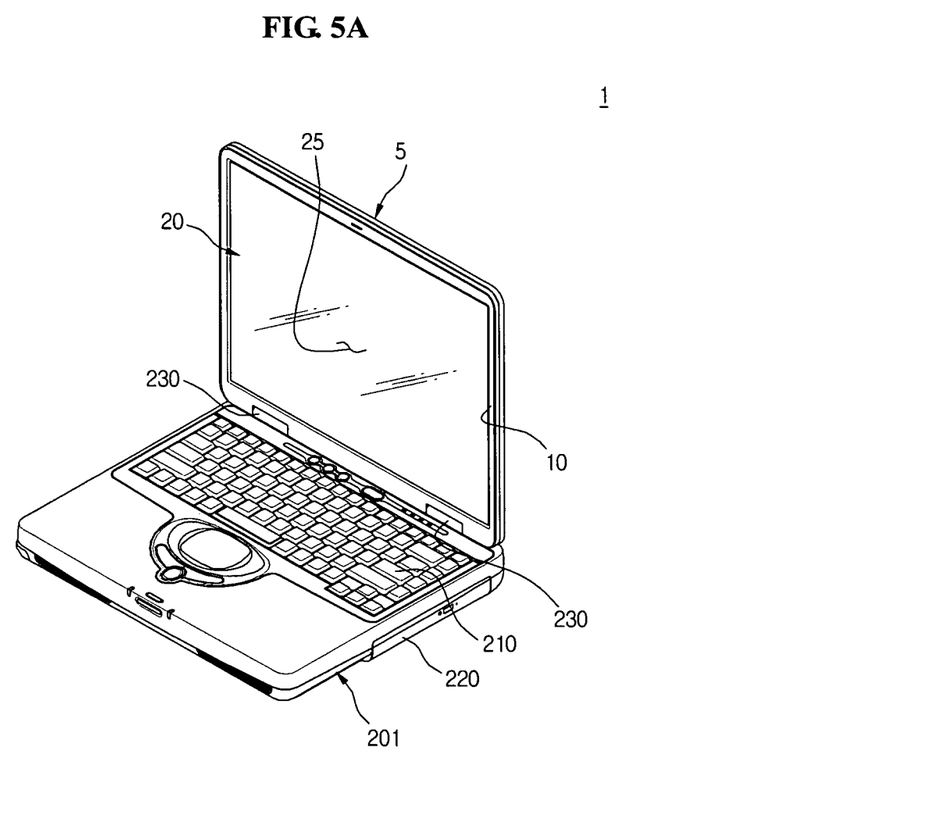
FIGS. 5A and 5B are perspective views of a portable computer according an exemplary embodiment of the present invention.
Figure 5B:
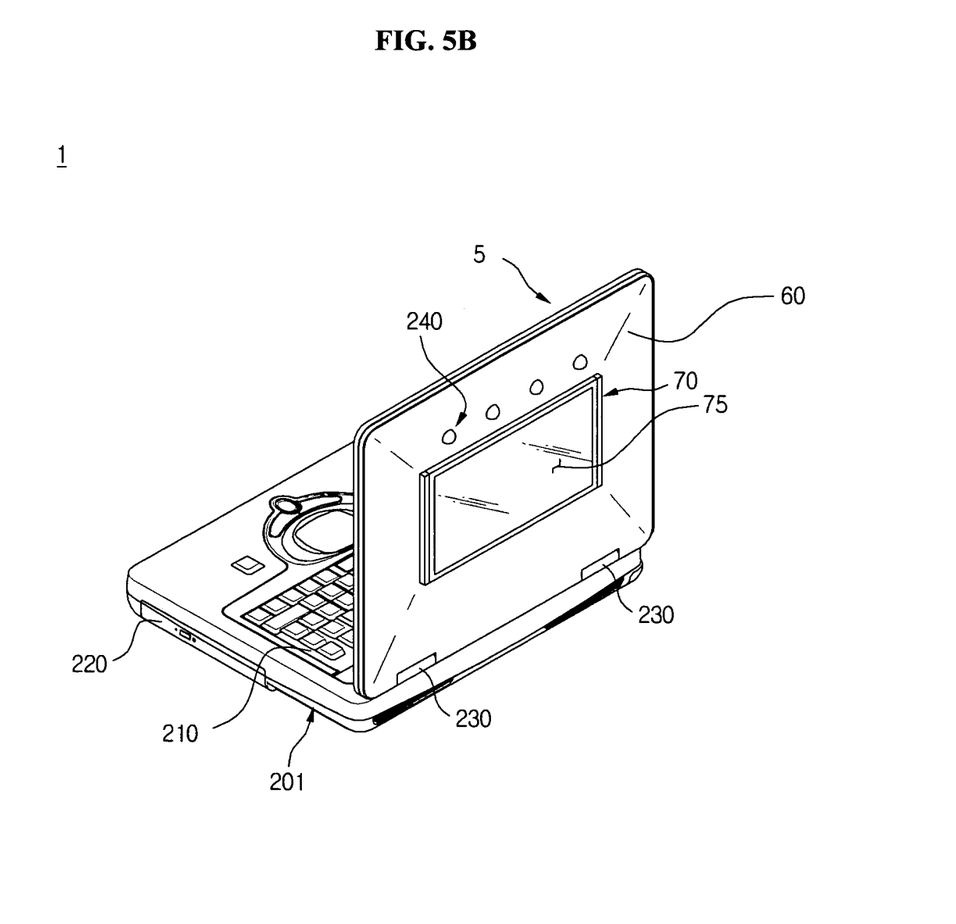

FIGS. 5A and 5B are perspective views of a portable computer according to an exemplary embodiment of the present invention.

As shown in FIG. 5A, a portable computer 1 includes a main body 201 having a power supply unit 220 and a LCD device 5 for displaying an image provided from the main body 201. The LCD device 5 is connected to the main body 201 by hinges 230. The LCD device 5 has a first LCD panel 20 having a first display unit 25 facing an input unit 210 provided on the main body 201.

The first LCD panel 20 displays the image toward the first cover 10. The LCD display panel 20 includes a first display unit 25 to function as a main display unit. The first display unit 25 is oriented toward the input unit 210. The first LCD panel 20 having the first display unit 25 may receive electric power from the power supply unit 220.

As shown in FIG. 5B, the second LCD panel 70 of the portable computer 1 is disposed with a rear surface facing the first display unit 25. That is, the second LCD panel 70 is provided in the second cover 60 to provide a second display unit 75 with the rear surface facing the first display unit 25.

The second cover 60 is provided to protect the LCD device 5. In the related art, the display unit is protected by folding the LCD device 505 on the main body 701. In use, the LCD device 505 needs to be unfolded and the main body 701 is turned on. However, in the present invention, the second display unit 75 is provided in the second cover 60. Hence, an image can be displayed on the second display unit 75 of the second LCD panel 70 even when the LCD device 5 is folded on the main body 201.

A menu window may be provided on the second display unit 75 by the user. Therefore, even when the LCD device 5 is folded on the main body 201, the portable computer 1 can be quickly operated through the menu window of the second display unit 75. In addition, a menu input key unit 240 for controlling the second LCD panel 70 is provided on the second cover 60 to control the menu window disposed on the second display unit 75. The second LCD panel 70 may have a touch-screen function.

As described above, in a state when the backlight assembly of the first LCD panel 20 is turned off or the LCD device 5 is folded, the user can quickly identify the information of the main body 201 without opening the LCD panel 5.

Figure 6:
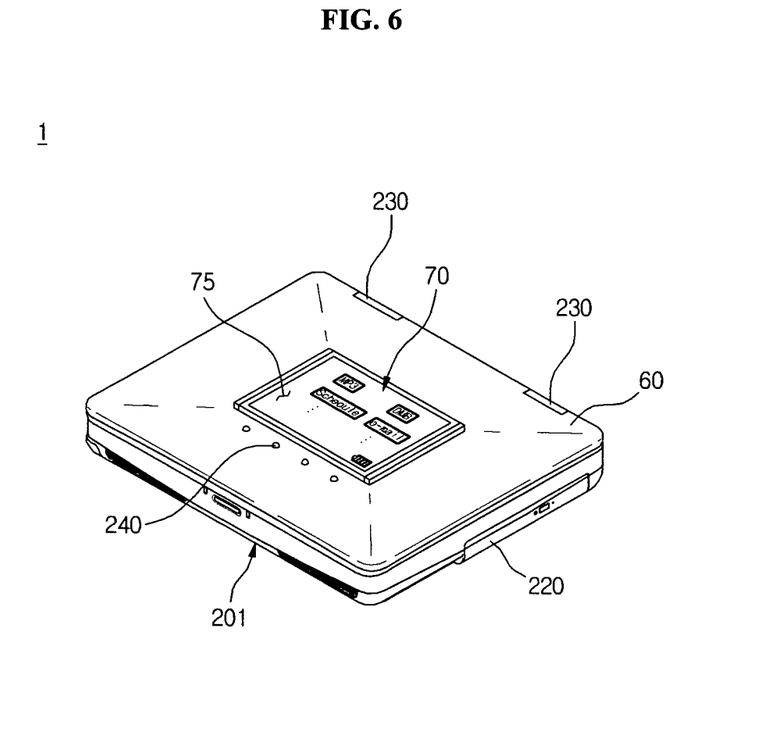
FIG. 6 is a view of a portable computer having a second display unit according to the exemplary embodiment of the present invention.

FIG. 6 is a view of a portable computer having a second display unit 75 according to the exemplary embodiment of the present invention. As shown in FIG. 6, the LCD device 5 of the portable computer 1 is connected to the main body 201 by the hinge 230. The hinge 230 allows the LCD device 5 to be folded on the main body 201.

The LCD device 5 includes first and second display units 25 and 75 for displaying an image. The first display unit 25 faces the input unit 210 of the main body 201. Therefore, the user cannot see the image displayed on the first display unit 25 when the LCD device 5 is folded on the main body 201. The second display unit 75 has a second LCD panel 70 exposed through the second cover 60. Therefore, even when the LCD device 5 is folded on the main body 201, the user can identify the information of the portable computer 1 through the second display unit 75.

The second display unit 75 may display an initial menu input to the user. The initial menu can display a music player, e-mail, schedule, digital media broadcasting (DMB) player, and the like. That is, the user can control relatively simple functions such as an email checking function, a schedule identification function, and an MP3 play function through the second LCD panel 70. Therefore, the portable function of the portable computer 1 can be enhanced.

In addition, the menu input key unit 240 is provided on the second cover 60 for the menu selection on the second LCD panel 70. Moreover, an initial menu can be selected using a touch-screen function of the second LCD panel 70. Therefore, the second LCD panel 70 provides the information to the user even when the LCD device 5 of the portable computer 1 is folded on the main body 201. That is, even when the backlight assembly of the portable computer 1 is turned off or the LCD panel 5 is folded on the main body 201, the user can identify the information of the main body 201.

As described above, since the second display unit 75 having the second LCD panel 70 is exposed through the second cover 60, a variety of functions such as a personal digital assistant (PDA) function, a global positioning system (GPS) function, a motion picture play function, a music play function, and an email function can be displayed on the second display unit 75 having the second LCD panel 70. Therefore, a quick view can be realized without opening the LCD device 5 of the portable computer 1. This arrangement provides improved convenience to the user of the portable computer.

Figure 7:
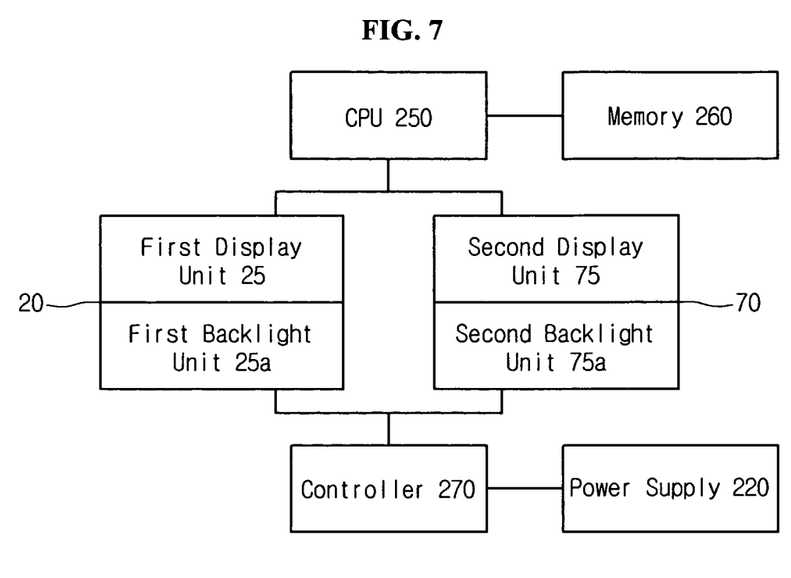
FIG. 7 is a block diagram illustrating an exemplary embodiment for controlling the liquid crystal display device according to the present invention.

FIG. 7 is a block diagram illustrating an exemplary embodiment for controlling the LCD device according to the present invention. As shown in FIG. 7, a central processing unit (CPU) 250 connected to a memory 260 provides the information to be displayed on the first and second LCD panels 20 and 70. In particular, the CPU 250 sends image signals to the first and second display units 25 and 75, respectively. The image displayed on the first and second display units 25 and 75 are visible by a user due to the operation of first and second backlight units 25a and 75a, respectively. A controller 270 connected to the power supply unit 220 determines which of the first and second backlight units 25a and 75a to turn on or off based on whether the LCD device 5 is in an unfolded state or a folded state. In this manner, the controller 270 determines whether information is displayed on a first LCD panel 20 or a second LCD panel 70. For example, the controller 270 may include a switch that activates the first LCD panel 20 when the LCD device 5 is unfolded or activates the second LCD panel 70 when the LCD device 5 is folded unto the main body 201.

Figure 8:
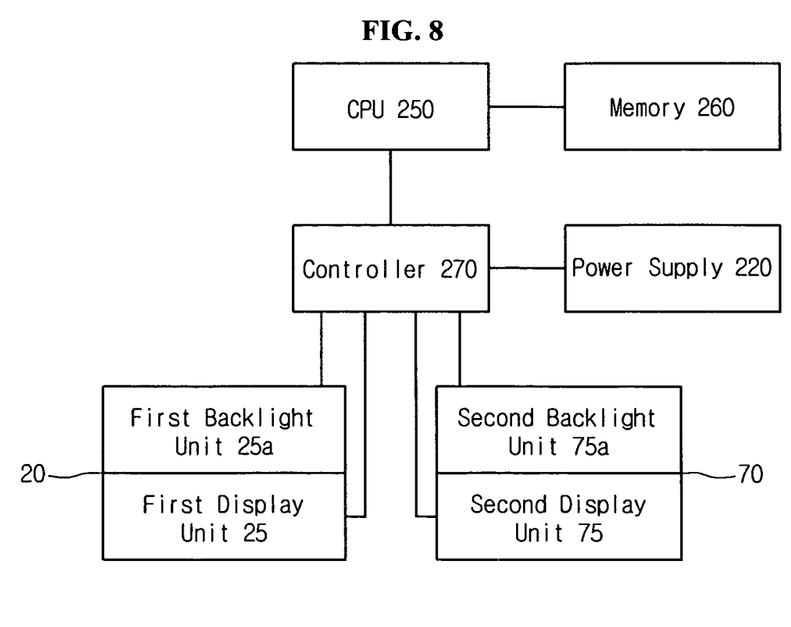
FIG. 8 is a block diagram illustrating an alternative exemplary embodiment for controlling the liquid crystal display device according to the present invention.

FIG. 8 is a block diagram illustrating an alternative exemplary embodiment for controlling the liquid crystal display device according to the present invention. As shown in FIG. 8, a CPU 250 connected to a memory 260 provides the information to be displayed on the first and second LCD panels 20 and 70. A controller 270 connected to a power supply unit 220 determines which of the first and second backlight units 25a and 75a, respectively, are in an on or off state based on whether the LCD device 5 is in an unfolded state or a folded state. In addition, the controller 270 determines which of the first and second display units 25 and 75, respectively, are to be applied with image data from the CPU 250. In this manner, the controller determines whether information is displayed on a first LCD panel 20 or a second LCD panel 70. For example, the controller 270 may include a first switch that activates the first LCD panel 20 when the LCD device 5 is unfolded or activates the second LCD panel 70 when the LCD device 5 is folded onto the main body 201. In addition, the controller 270 may include a second switch that applies the image signals from the CPU 250 to the first display unit 25 when the LCD device 5 is unfolded or applies the image signals to the second display unit 75 when the LCD device 5 is folded.

According to the present invention, since the plate 100 supporting and fixing the second LCD panel 70 is disposed between the main frame 50 and the second LCD panel 70, the LCD device 5 can be easily assembled. In addition, there is no need to provide an additional structure for supporting and fixing the second LCD panel 70 on the first LCD panel 20. As a result, the manufacturing cost and assembling time can be reduced. Therefore, the LCD devices can be easily mass-produced.

In addition, since the plate may be formed of a lightweight material such as aluminum alloy, stainless steel, enhanced plastic, or the like, the overall weight of the LCD device 5 can be reduced, thereby solving the weight limitation problem. As described above, the thickness and weight of the plate 100 can be varied according to the material or shape thereof, thereby solving the weight or thickness limitation problem.

Furthermore, since the plate 100 can be easily attached on the first cover 10 and the main frame 50, the LCD device 5 can be easily assembled in the LCD panel assembling company. In addition, since the second LCD panel 70 can be detachably attached to the plate, the assembly of the present invention can be adapted to any production line. Therefore, a standardized LCD device can be produced using the plate.

As PDA, GPS, motion picture play, music play, email identification functions, and the like can be displayed on the second LCD panel 70 provided on the second cover 60, the quick view can be realized without opening the LCD device 5. Accordingly, the user of portable computer 1 can more easily access common functions without unfolding the LCD device 5.

In addition, the LCD device 5 may employ the CPU connected to the main body 201, or may employ a second CPU connected to the LCD device 5. In the case that the LCD device 5 employs the CPU connected to the main body 201, the first LCD panel 20 is turned off when the cover is folded, and the second LCD panel 70 may be turned on. In the case that the LCD device 5 employs the second CPU connected to the LCD device 5, the processor connected to the main body 201 can be turned off while the second processor supports the functionality of the second LCD panel 70.

It will be apparent to those skilled in the art that various modifications and variations can be made in the liquid crystal display device and a portable computer having the liquid crystal display panel of the present invention without departing from the spirit or scope of the invention. Thus, it is intended that the present invention cover the modifications and variations of this invention provided they come within the scope of the appended claims and their equivalents.

What is claimed is:

1. A method for forming a liquid crystal display device, the method comprising:
    forming a first liquid crystal display panel disposed between a first cover and a second cover;
    forming a second liquid crystal display panel disposed between the first cover and the second cover, a rear face of the second liquid crystal display panel facing a rear face of the first liquid crystal display panel;
    forming a main frame disposed between the first and second liquid crystal display panels;
    forming a plate to connect the second liquid crystal display panel to the main frame;
    forming a first supporting portion along an edge portion of a body of the plate and bent toward the main frame to engage the main frame; and
    forming a second supporting portion on the body and bent toward the second cover to accommodate the second liquid crystal display panel, such that the bending of the second supporting portion forms a bend hole directly adjacent the bend,
    wherein a plurality of cut-out holes are formed on the body, wherein the cut-out holes comprise:
        a first cut-out hole opposite to the second liquid crystal display panel, and
        a plurality of second cut-out holes, and
    wherein the first cut-out hole and the second cut-out holes are formed on a same plane.

2. The method for forming a liquid crystal display device according to claim 1, wherein the plate is attached to the main frame by a two-sided tape.

3. The method for forming a liquid crystal display device according to claim 1, wherein the first and second supporting portions are integrally formed with the body.

4. The method for forming a liquid crystal display device according to claim 1, wherein the first and second supporting portions include a chevron-shape or a hook-shape.

5. The method for forming a liquid crystal display device according to claim 1, wherein the plate is formed from at least one of aluminum alloy, stainless steel, or plastic.

6. The method for forming a liquid crystal display device according to claim 1, wherein the second supporting portion includes a plurality of supporting ribs defining a space corresponding to a shape of the second liquid crystal display panel.

7. The method for forming a liquid crystal display device according to claim 1, wherein a resilient member is provided on a surface of the body.

* * * * *